Jan. 23, 1951 R. S. BEGG 2,539,050
VEHICLE FRONT END CONSTRUCTION
Filed Nov. 8, 1946 4 Sheets-Sheet 1

Inventor
Russell S. Begg
By
Spencer, Willits, Helwig & Baillio
Attorneys

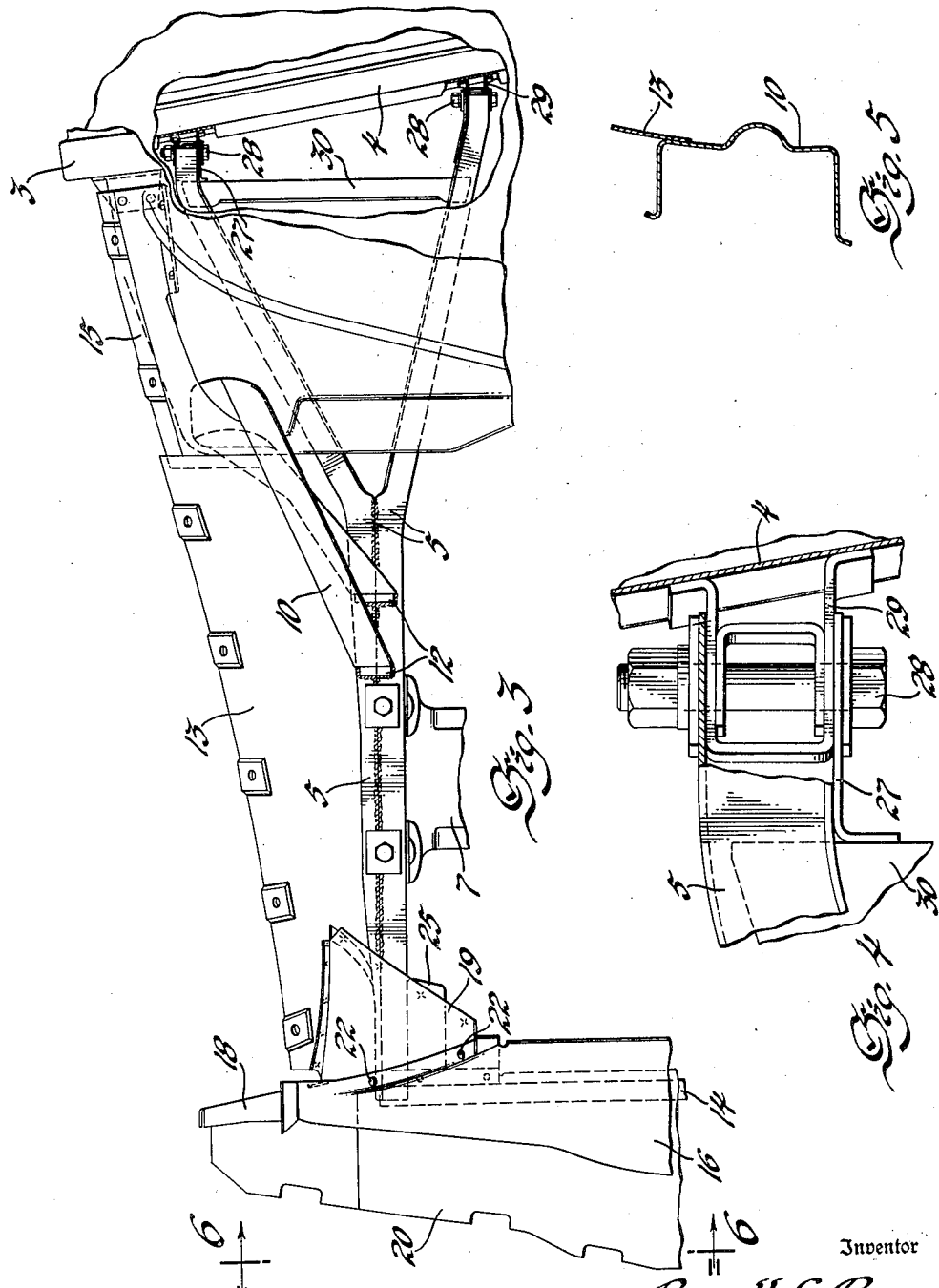

Jan. 23, 1951 R. S. BEGG 2,539,050
VEHICLE FRONT END CONSTRUCTION
Filed Nov. 8, 1946 4 Sheets-Sheet 3
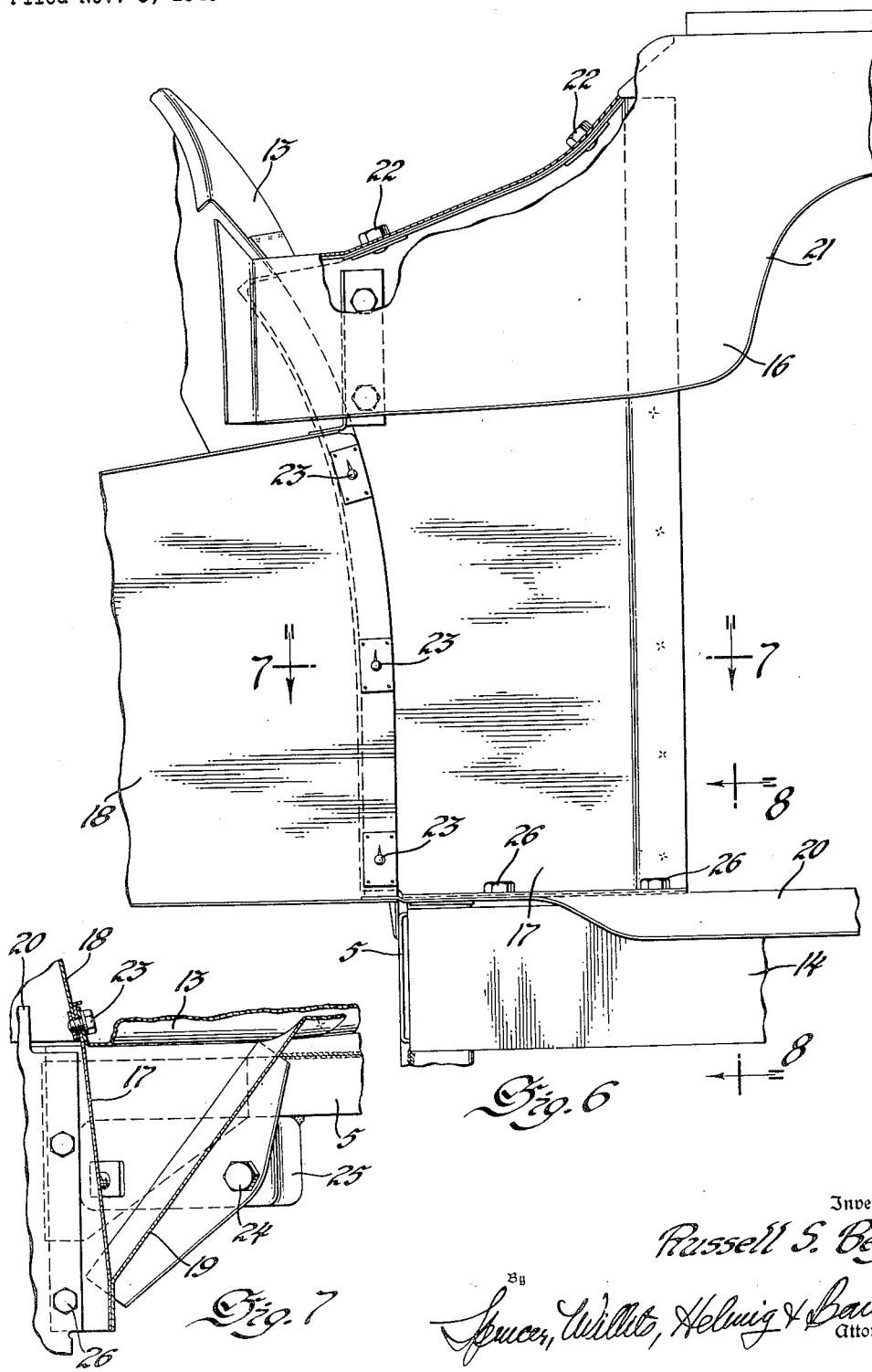
Inventor
Russell S. Begg
By
Spencer, Willits, Helmig & Baillio
Attorneys Patented Jan. 23, 1951

2,539,050

UNITED STATES PATENT OFFICE 2,539,050

VEHICLE FRONT END CONSTRUCTION

Russell S. Begg, Birmingham, Mich., assignor to General Motors Corporation, Detroit, Mich., a corporation of Delaware Application November 8, 1946, Serial No. 708,667

2 Claims. (Cl. 296—28)

This invention relates to motor vehicles and more particularly to an improved end sub-assembly unit. According to a preferred embodiment the load-carrying body is constructed as a sub-assembly to be mounted directly upon road gear such as the rear driving wheels, and its opposite or cowl end is detachably joined to and supported by a front end structure which also mounts the power plant and includes or is spring-supported by the front road gear comprising steerable wheels. The members constituting the front end structure are so designed, arranged and joined to one another as to provide an abundance of strength for the proper transmission of normal loading and resistance to shock in the many directions of applied stress. They are furthermore of a character to be easily fabricated from simply formed stock and for quickly putting them together by readily available procedures into mutually cooperative relation affording great rigidity in the final simplified coordination with the body unit. The distinct unit assembly for separably joining to the body will facilitate the ease of over-all vehicle production as well as subsequent repair operations.

For a detail explanation reference will be made to the accompanying drawings wherein—

Figure 3 is a top plan view of the structure shown in Figure 2 with parts broken away.

Figure 4 is a detail view on a larger scale of one of the unit joinings.

Figure 5 is a section on line 5—5 of Figure 1.

Figure 6 is a front elevation looking in the direction of the arrows on line 6—6 of Figure 3.

Figure 1:
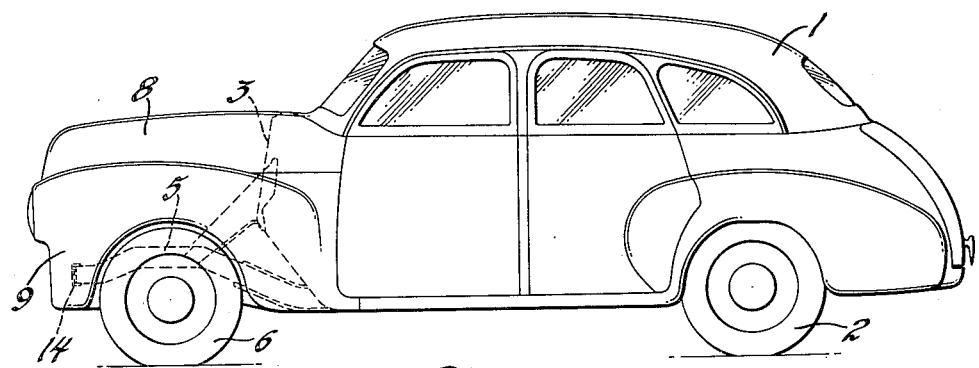
Figure 1 is a side elevation of a motor vehicle constructed in accordance with the present invention.
Figure 2:
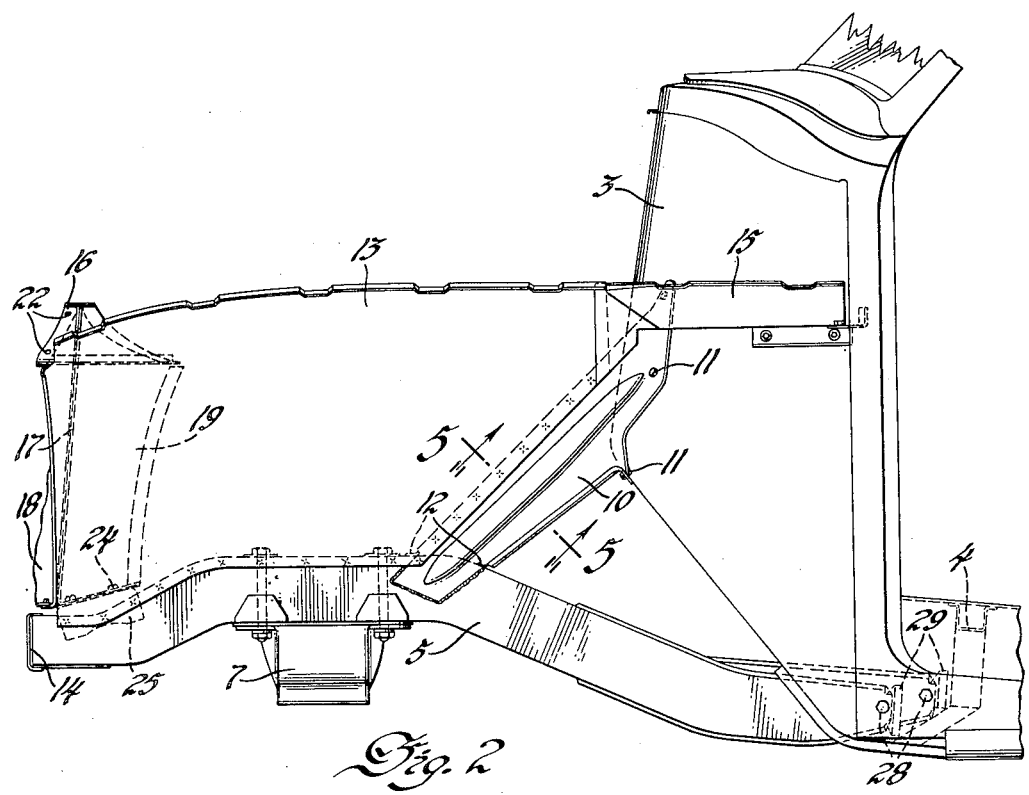
Figure 2 is an enlarged side elevation of the front portion of the vehicle with parts removed.
Figure 8:
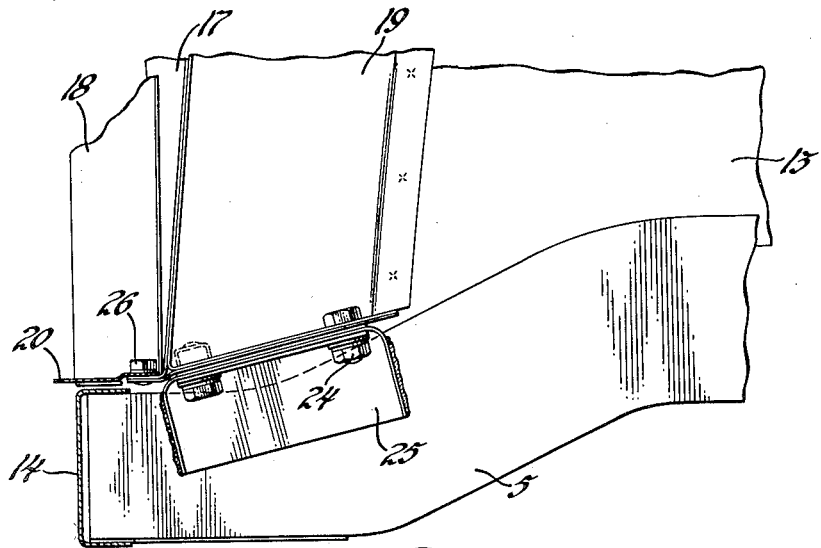

Figures 7 and 8 are sections on lines 7—7 and 8—8 respectively of Figure 6.

Figure 9:
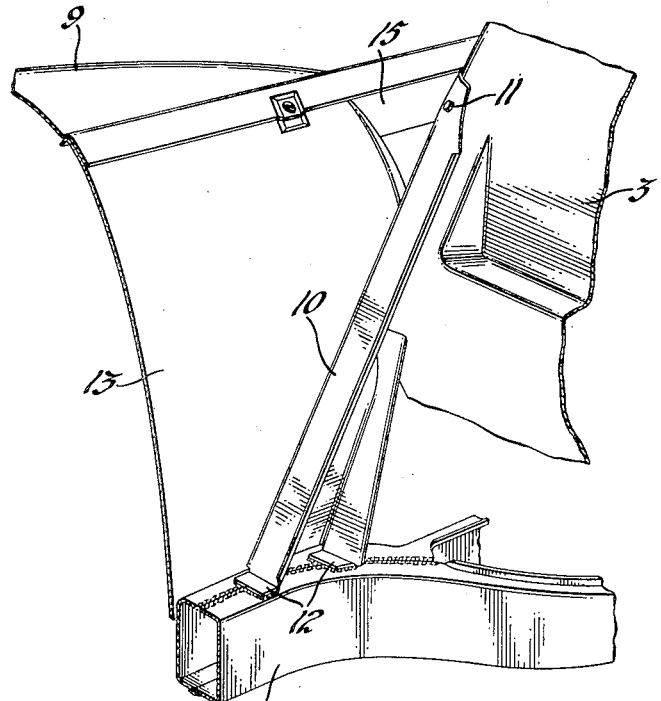

Figure 9 is a perspective fragmentary view illustrating the assembled relation of the front end structural elements.

It is here proposed to eliminate the usual independent chassis frame and to build additional strength into the body structure 1 which is spring supported on the rear wheels 2. Immediately below and cooperating with the rugged cowl structure 3 is the under-body framing including a transverse member 4, from which projects forwardly the main frame extension members 5—5 of the front sub-assembly unit. The members 5 are four in number, each of channel section, and are arranged for detachable connection with the under-body member 4 at four transversely spaced points for a wide distribution of the forces to be transmitted, and furthermore they are located in pairs on opposite sides of the vehicle center line, and thus on each side have their channels face to face and projected forwardly in convergent relation to a mid-point from which they extend straight ahead with their abutting flanged edges welded together to form a box section. Throughout their length of convergence the members 5 are also forwardly and upwardly inclined to an upwardly arched central region immediately above the axis of the front wheels 6.

For simplicity of disclosure the wheel suspension details are omitted from the drawing and can be considered as being of the popular independent type wherein the wheel knuckle is pivoted to swinging upper and lower control arms journalled to a transverse frame member 7 with a coil spring interposed between the lower control arm and the adjacent end of the member 7. The member 7 extends under and between both of the side members 5—5 to support the same and transmit the load directly into the road wheels 6. It is bolted to the side members preferably with interposed rubber cushioning or insulating pads. Between the two side members the transversely extending wheel connecting member 7 serves also to support or mount the usual power plant enclosed in the hood or bonnet 8 between the wheel fenders or mud-guards 9—9.

Ahead of the power plant the forward ends of the side rail members 5—5 are joined together by welding thereto a channeled frame member 14 extending transversely and cooperating with the side members to form in plan a substantially U-shaped frame whose side rails terminate rearwardly in forks constituted by the diverging arms which extend respectively downwardly and outwardly and downwardly and inwardly from the upwardly arched region joined to and supported by the road gear.

Also extending from the road gear loading region and adjacent the point of divergence of the forked arms of each side member is an upwardly and rearwardly inclined compression strut or brace 10 pressed to channel section from sheet metal for attachment by bolts 11 to the side corner of the cowl 3. The web of the channel section strut 10 at its lower end is welded to the adjacent side of its associated frame member 5 whose upper surface has welded to it the forwardly bent terminal feet 12 on the side flanges of the strut as best seen in Figure 9. Within the obtuse angle between the strut 10 and frame member 5 is an upwardly extending load carrying plate 13 having its lower and rear edges shaped to conform to and secured by welding to the vertical webs of the strut and frame member. This plate 13 is pressed from relatively thin and light-weight sheet metal and for strengthening purposes it is preferably formed throughout its area with suitable stiffening formations, not shown, but which, for example, can be of the conventional waffle pattern type. The plate also serves as a wheel splash guard or side wall shield for the engine compartment between the side legs 5—5 of the forward extension frame and is curved upwardly and outwardly with its upper edge preformed as an attachment flange for the wheel fender 9 as well as a supporting ledge for the side of an alligator type of engine hood or bonnet 8.

Rearwardly of the plate 13 and aligned with the upper joining flange is a continuation of the flange and hood support on a short length stamped piece 15 bolted or otherwise secured to the cowl along its side wall. The continuation piece 15 may be overlapped or butted against but is preferably fastened to the plate 13 either removably or permanently, and its formation separately as distinguished from integral formation with the shield plate 13 considerably lessens costs.

For the same reason sheet metal extending transversely across the front end of the forward sub-assembly, and which defines the opening for the usual engine cooling radiator and ties together the forward edges of the shields 13 on the two sides, instead of being formed from a single large sheet, is made up of a number of small stampings from pieces left over from the larger stamping portions, and which pieces otherwise would be scrap material. These small front end stampings include as the principal parts the elements numbered 16, 17, 18, 19 and 20, and they are shaped and arranged to mount a decorative air-intake grille ahead of the radiator and to direct the incoming air toward the centrally located radiator. It may be said that the particular grille here involved is wider than the radiator core and extends outside beyond the side members 5—5, and is larger vertically in its central portion directly ahead of the radiator than it is in the opposite end portions. It is also bulged forward at the center and is curved back from the base toward the top. Thus the upper stamping 16 which lies in front of the top of the radiator core and beyond each side has its lower edge centrally raised, and is bound by a forwardly projecting stiffening flange 21 to receive the top rail of the grille. In its side or end portions the upper edge is flanged backwardly for attachment by bolts 22 to the upper flange on the vertical and transversely extending stamping 17, which cooperates with the similarly disposed but shorter stamping 18 to afford an outwardly and forwardly flaring deflector wall to lead incoming air centrally toward the radiator core. The stampings 17 and 18 are joined to each other and to an out-turned forward flange on the shield 13 by a series of fastening bolts 23.

For increased corner rigidity a diagonal bracing plate 19 has its forward vertical edge welded to the innermost edge of the stamping 17 and its rearward edge welded to the shield plate 13 in rearwardly spaced relation to the forwardly flanged attachment edge. A bottom flange on the stamping 19 is additionally bolted at 24 to a corner box 25 welded or otherwise fastened to the frame members 5 and 14. At its bottom edge the stamping 17 has a forwardly bent flange to which is bolted at 26 the lower horizontally disposed stamping 20 which in cooperation with the bottom flange of the stamping 18 defines the lower boundary of the air intake opening and provides for the attachment of the bottom rail of the radiator grille.

In manufacture the channel members 5 are separately preformed to the central arched configuration and with the rear portion bent to the predetermined angle. Mating channels are then welded together in a suitable fixture and a tie-bar 30 is welded adjacent the rear terminals. Brackets such as 27 are added to cooperate with the channel webs in providing spaced arms having aligned openings to receive attachment bolts 28 by which the frame members are secured to mounting brackets 29 on the under-body. Also the compression struts 10 are located by a fixture in proper position and angular relation to the frame members 5 and then welded in place, and the shields 13 and front connector member 14 are similarly applied.

After completion of the forward sub-assembly unit, which may include the further sub-assembly of the road gear of which the cross member 7 is a part, and also with the power plant mounted on the member 7, the entire unit can be brought together with the previously assembled body and rear end unit and joined together simply by the four transversely spaced attachment bolts 28 and by the bolts 11. Besides facilitating the final vehicle assembly operation the simplified coupling will be helpful to subsequent service and repair operations inasmuch as the separable units can easily be taken apart for greater and more convenient accessibility. It is to be noted that the resulting arrangement as described insures that the load from the body unit is transferred to the side frame members at their arched regions immediately over the running gear on both sides through the several cooperating arms all angularly related to one another and converging from the several spaced portions on the body unit directly in the neighborhood of the running gear.

I claim:

1. In a motor vehicle, a load carrying-body terminating in a cowl and having underbody framing, a motor supporting extension sub-assembly to be mounted on road gear and comprising a pair of longitudinal elements each having forked terminals for detachable joining at transversely spaced points to the underbody framing, inclined compression struts rigidly carried in the region of the running gear mounting by intermediate portions of said longitudinal elements and projected upwardly toward said cowl for detachable joining to the cowl, and a vertically disposed load-carrying stiffener plate extending upwardly from each longitudinal member and its associated compression strut and being shaped to fit the obtuse angle therebetween with a diagonally disposed rear marginal edge to mate with the inclination of said strut, said stiffener plate being rigidly joined along its lower marginal edge to said member and also along its diagonally extending rear marginal edge to said inclined strut and serving as a strengthening gusset and as a unitary part of the detachable sub-assembly.

2. A motor vehicle having a body unit supported rearwardly on road wheels and provided forwardly with a cowl, a power plant carrying unit separable from the body unit and including transversely spaced framing elements intermediately supported on forward road wheels, upwardly and rearwardly inclined braces joined to said elements and projected therefrom in the region supported by the wheels, detachable connections between said braces and said cowl, rearwardly divergent arms extending from said region on the elements to transversely spaced detachable connection with the body unit and stress plates having their lower and rear marginal edges in angular relation substantially conforming to the obtuse angle formed between said inclined braces and elements rigidly joined to said elements and braces, and each disposed in an upwardly projecting plane and entirely within said obtuse angle and serving both as a reinforcement and as a closure wall for the engine compartment ahead of said cowl.

RUSSELL S. BEGG.

REFERENCES CITED

The following references are of record in the file of this patent:

UNITED STATES PATENTS

| Number | Name | Date |
|---|---|---|
| 2,140,476 | Ledwinka | Dec. 13, 1938 |
| 2,248,319 | Waterhouse, Jr. | July 8, 1941 |
| 2,289,395 | Ulrich | July 14, 1942 |
| 2,306,416 | Waterhouse, Jr. | Dec. 29, 1942 |
| 2,324,677 | Cadwallader | July 20, 1943 |
| 2,403,145 | Ulrich | July 2, 1946 |